United States Patent
Uraya et al.

[15] 3,659,989
[45] May 2, 1972

[54] APPARATUS FOR IMPROVING SPINNABILITY AND PROPERTY OF COMPOSITE FILAMENT

[72] Inventors: Toru Uraya, Kobe City; Shusuke Kageyama, Osaka, both of Japan

[73] Assignee: Kanegafuchi Boseki Kabushiki Kaisha, Tokyo, Japan

[22] Filed: June 19, 1970

[21] Appl. No.: 47,862

Related U.S. Application Data

[63] Continuation of Ser. No. 568,016, July 26, 1966, Pat. No. 3,536,802.

[30] Foreign Application Priority Data

Aug. 2, 1965 Japan..................................40/47078
July 15, 1966 Japan..................................41/46271

[52] U.S. Cl..........................425/131, 264/176 F, 425/199, 425/379
[51] Int. Cl. .......................................................D01d 3/00
[58] Field of Search ..........................264/171 F, 168, 176 F; 18/8 SM, 8 SC

[56] References Cited

UNITED STATES PATENTS

| | | | |
|---|---|---|---|
| 2,931,091 | 4/1960 | Breen | 18/8 SC X |
| 3,320,633 | 5/1967 | Cancio et al. | 18/8 SC |
| 3,197,813 | 8/1965 | Le Grand | 18/8 SC |
| 3,408,277 | 10/1968 | Martin et al. | 264/168 |

*Primary Examiner*—J. Spencer Overholser
*Assistant Examiner*—Michael O. Sutton
*Attorney*—Stevens, Davis, Miller and Mosher

[57] ABSTRACT

Method and apparatus for spinning a composite filament wherein two polymers having different melt viscosities are melted separately and the temperature of each maintained so that the melt viscosity ratio of the molten polymers is 0.4 to 2.5 until extrusion. The apparatus includes means for controlling the temperatures of the two spinning melts separately and retarding transmission of heat between the melts until they are extruded together.

7 Claims, 8 Drawing Figures

APPARATUS FOR IMPROVING SPINNABILITY AND PROPERTY OF COMPOSITE FILAMENT

This application is a continuation-in-part of our copending application Ser. No. 568,016, filed July 26, 1966, and now U.S. Pat. No. 3,536,802, issued Oct. 27, 1970.

The present invention relates to a method and an apparatus for forming a composite filament in which a plurality of different fiber-forming thermoplastic synthetic linear polymers are bonded eccentrically along the length of filament, in which said polymers are separately melted and then spun simultaneously from the same orifice, wherein the spinnability is improved, and thus evennesses of the size of filament and the conjugate ratio of the component polymers along the length of the filament and the production efficiency are highly improved.

It has been well known that according to so-called "conjugate spinning process," a plurality of fiber forming polymers having different chemical and physical properties are formed into a unitary filament in which these polymers are arranged eccentrically in any cross-section of filament and that the resulting filament develops spiral crimps when subjected to a proper after-treatment, such as, heating of a treatment with a swelling agent, due to difference of thermal shrinkage or swelling property of the component polymers of the filament and some proposals have been already made and practised commercially.

However, in this field, heretofore investigations have not been substantially directed to spinnability in the spinning process but mainly to improvement of crimpability or crimp stability of the resulting filament and in the practical industrial production, and there have been a number of difficulties in spinnability and drawbacks in properties of the product and production efficiency. Namely, in order to provide a high crimpability, for example, the following processes have been attempted, in one of which the same kinds of two polymers consisting of the same monomer and having different average degree of polymerization are conjugate spun and in the other of which different polymers, copolymers or blend polymers having remarkably different physical properties, particularly, property in a molten state are spun. In these many cases, a bending phenomenon of unsolidified filament immediately after the extrusion is an important problem to be solved.

Such a bending phenomenon occurs remarkably when a plurality of polymers are bonded in a high eccentric relation in the cross section of filament and particularly, when said polymers are arranged adjacently in a side by side relation. When the bending phenomenon is very much, the bent polymers immediately after extruded from orifice contact and adhere to the spinneret surface and the spinning operation cannot be effected. In the specification of U.S. Pat. No. 3,176,342, there has been disclosed a spinneret in which in order to prevent the bent polymers from adhesion to the spinneret surface, orifice is protruded relatively to the surrounding spinneret surface. Further more, in the specification of British Pat. No.965,729 there has been disclosed a method in which in order to project the polymers in perpendicular direction as far as possible, two polymers having different melt viscosities are conjugate spun by using a spinneret provided with orifice, the central axis of which is inclined against spinneret plate in opposite direction to bending direction of the polymers. However, the spinneret disclosed in the aforesaid U.S. patent does not solve fundamentally the problem and a fluctuation phenomenon and an unevenness of tension occur based on the bending of the filament, so that the conjugate ratio of the resulting composite filament is not even and the unevenness of the size of filament is brought about and therefore the property of the product is considerably deteriorated. Moreover, in order to prevent increase of the bending phenomenon, it is impossible to increase considerably the spinning velocity, while it is necessary to maintain the distance between orifices in the spinneret surface sufficiently large to prevent bent spun filaments from contact each other, so that the spun amount per unit area of the spinneret plate is considerably limited and the production efficiency is affected adversely.

Furthermore, the method described in the aforesaid British patent has some disadvantages, in which a suitable spinneret plate must be selected depending upon the kind of polymers, the direction for feeding the polymers to the spinneret can not be changed and the manufacture of the spinneret plate is rather difficult.

After deliberate investigations with respect to interrelation between physical property of the starting polymers, the bending phenomenon, adhesion to spinneret and properties of the resulting filament, the inventors have found that the above described troublesome bending phenomena depend upon mainly difference of viscosity of different molten polymers and when the difference of viscosity is remarkable, the melts extruded from the orifice after combined and bonded in the spinneret are bent to the side of the polymer having higher viscosity and that if ratio of the melt viscosities in spinning temperature of the both polymers is more than 3.0, the melt adheres to the spinneret surface and the spinning operation can not be effected. The invention is accomplished based on investigation with respect to an important corelation between the melt viscosity of the polymers and the bending phenomena.

An object of the invention is to provide a novel method for conjugate spinning a plurality of fiber forming thermoplastic synthetic linear polymers, wherein said bending phenomena in the extruding stage are reduced to a minimum and the spinning operation is carried out smoothly in a high efficiency. A further object of the invention is to provide a composite filament having latent crimpability and highly improved evenness of the size of filament and conjugate ratio of the component polymers along the length of filament.

A further important object of the invention is to provide an improved spinneret for carrying out the above mentioned method.

The other object will be illustrated in more details by the following description.

The method of the present invention is characterized in that when two fiber forming thermoplastic synthetic linear polymers having different melt viscosities in each optimum spinning temperature are separately melted and then extruded simultaneously from the same orifice to form a unitary filament in which these polymers are bonded eccentrically along the length of filament, the melt viscosities of said two polymers are regulated independently prior to extrusion of the molten polymers to keep the ratio of melt viscosity of said two copolymers within the range of from 0.4 to 2.5 and then the molten polymers are extruded.

With respect to relation between melt viscosity of thermoplastic synthetic linear polymer and its temperature and degree of polymerization, the following equation has been proposed by P.J. Flory. Namely, the melt viscosity is $\mu$, absolute temperature T, and an average molecular weight Z and they have the following relation:

$$\log \mu = A + B/T + C(Z)^{1/2}$$

wherein, $A$, $B$ and $C$ are constants and $B$ is temperature coefficient, $C$ degree of polymerization coefficient and $A$ a constant of substance relation to melting point, etc.

The Flory's equation for melt viscosity is applied properly to conventional fiber forming thermoplastic synthetic linear polymers, such as, polyamide, polyester, polyolefin, and etc., within a range of temperature suitable for spinning and it shows that melt viscosity of polymer varies depending upon the kind of polymers, that the melt viscosity decreases as the temperature increases in a homologous series of polymers and that it increases as the average degree of polymerization, that is, intrinsic viscosity increases.

For example, the relation between intrinsic viscosity ($\eta$) of polycapramide and melt viscosity at each temperature obtained from the results of experiments is shown in FIG. 1. The term "intrinsic viscosity" used herein means one defined by the following equations $$(\eta) = \lim_{C \to 0} \left(\frac{\eta sp}{C}\right)$$

wherein $$\eta_{sp} = \eta/\eta_o - 1$$

$\eta$ : viscosity of a solution of a polymer dissolved in m-cresol at 30° C.

$\eta_o$ : viscosity of pure m-cresol at 30° C.

$C$ : Concentration of the polymer in g./100 cc. of the solution.

The limiting value of $C \to O$ is extrapolation of found values of various concentrations of $C = 0.1, 0.2, 0.3, 0.4$ and $0.5$ percent to $C = 0$.

In polyamide to be used for sample, water soluble components are extracted sufficiently by a conventional process and then the resulting polyamide is dried to control the water content to less than 0.1 percent. The dried polyamide is dissolved in m-cresol having purity of more than 90 percent and the resulting solution is heated at a temperature from 95° C to 100° C for at least 4 hours to dissolve the polyamide sufficiently and then the solution is filtered. The viscosity of the resulting solution is determined by a conventional method by means of Ostwald's viscosimeter.

As shown from the diagram illustrated in FIG. 1, such above mentioned relation that if the value of intrinsic viscosity of polymer ($\eta$) increases, the value of melt viscosity at the same temperature also increases and in the polymers having the same intrinsic viscosity the melt viscosity decreases as temperature increases, can be proved. The similar diagrams can be obtained experimentarily with respect to other thermoplastic synthetic linear polymers, such as polyester, polyester ether, polyolefin and etc. or the copolymers, but with reference to polyamide, particularly, polycapramide the illustration will be made hereinafter for the convenience of the illustration.

Filament obtained by a conjugate spinning process in which two kinds of polycapramides having different number average degree of polymerization, that is, intrinsic viscosities are bonded eccentrically along longitudinal direction of filament develops spiral crimp by heat treatment due to difference of shrinkage ratio in hot water of polycapramides composing said filament. In this case, in order to develop an excellent crimp it is necessary that the difference of intrinsic viscosities of the both polyamides is at least 0.20, preferably, at least 0.25. However, these polycapramides having such a large difference of intrinsic viscosities have remarkable difference also in the melt viscosity at the same optimum spinning temperature, so that the spinning operation cannot be smoothly effected by a conventional method due to the bending phenomena. For example, the melt viscosities of polycapramides having intrinsic viscosity of 0.95 and 1.15 at 250° C are 800 and 1,100 poises respectively and when these polycapramides are conjugate spun in the side by side type through spinneret of 0.3 mm of dia. at 250° C in an extruded amount of 7.5 g/min. respectively at a take-up velocity of 600 m/min., the polymers are inclined by about 45° in the outlet of the orifice and the freshly spun filament is considerably uneven both in size and conjugate ratio. Furthermore, melt viscosities of polycapramides having intrinsic viscosity of 0.95 and 1.20 are 800 and 2,600 poises respectively, and in this case, the spun polymers adhere to the spinneret surface as soon as the spinning starts and the spinning operation cannot be effected. Then if the melt temperature of a polymer having lower melt viscosity, that is, a polymer having intrinsic viscosity of 0.95 is maintained at 250° C and the melt temperature of a polymer having higher melt viscosity, that is, a polymer having intrinsic viscosity of 1.20 is increased to 265° C, the bending phenomenon is considerably improved and in a temperature of 280° to 285° C this phenomenon can be solved to a substantially negligible extent and the extruded amount and the take-up velocity can be increased to 1.5 times as compared with the case of 265° C.

The term "the optimum spinning temperature" used herein means usually a temperature within the range from about 20° to 50° C higher than the melting point of the polymer, although it varies more or less depending upon the kind of thermoplastic synthetic linear polymer and it must be determined considering difference of melt viscosity due to difference of intrinsic viscosity and thermal stability of the polymer and the like. In the invention, a temperature about 35° C higher than the melting point of the polymer is defined as the optimum spinning temperature.

If the spinning temperatures in extrusion of two kinds of spinning materials having different melt viscosities at the optimum spinning temperature are adjusted independently and said materials are spun simultaneously from the same orifice at substantially the same melt viscosity, the above described bending phenomenon does not occur entirely, which is an ideal embodiment for carrying out the method of the invention into effect.

However, sometimes the melt viscosities at the optimum spinning temperature are considerably different according to the kind of the polymer to be used and if the temperature is increased extremely in order to remove the difference, the decomposition and foaming of the polymer are generated and in the worst case, coloring and carbonization and the like occur, and the workability and the properties of the fiber are damaged, so that such an increase of temperature must be avoided.

Concerning these problems, the upper limit of the melt temperature is a temperature 150° C higher than the melting point of the polymer, preferably, a temperature 100° C higher than the melting point, although the upper limit varies depending upon the kind of polymer and the time for maintaining the temperature condition. Accordingly, in practice, it is sometimes difficult to obtain the above described ideal condition for practice and if the ratio of melt viscosity of both polymers is 0.40 to 2.50, preferably, 0.50 to 2.00, most preferably, 0.80 to 1.25, the object of the invention can be attained. However, if the ratio of melt viscosity exceeds the above range, the spinning operation may be carried out attending many bending phenomena, although the strength, elongation, Young's Modulus, size and conjugate ratio of the resulting composite filament are uneven and satisfactory results can not be obtained.

Although in the method of the invention, it can be effected in various stages prior to extrusion that the polymer having higher melt viscosity is further heated solely, in any case it is necessary to avoid substantially transmission of heat of the both polymers. Such a heating can be carried out firstly in an apparatus for melting polymers. However, since in the melting apparatus, the staying time of the polymers in the molten state is longer, it should be avoided to keep the polymers under a temperature fairly higher than the optimum spinning temperature for a long period in order to prevent the decomposition, foaming, degradation or coloring of the polymers during such a time. In view of such a point, it is most preferable that the molten polymers in the melting apparatus are retained at the optimum spinning temperature proper to the polymers irrespective of the melt viscosity of each polymer and transferred to the spinneret, after which the polymer having higher melt viscosity is heated immediately in such a manner that the melt viscosities of the both polymers are near or same in the spinneret before extrusion of said polymer. However, if the temperature enough to bring about the ratio of melt viscosity of the both polymers to the desired value does not exceed the above described range of the optimum spinning temperature proper to the polymer, that is, the range of 20° to 50° C higher than the melting point and the decomposition, foaming and the other problems do not substantially occur even if such a temperature is retained for fairly long period, it is sufficient to set melt temperatures in the melting apparatuses suitably, whereby the melt viscosities of the both polymers are previously brought about to each desired value and then to control the temperatures so as to keep each temperature as it is in the spinneret. This adjustment and control of temperature can be easily carried out by using the spinneret according to the present invention as mentioned hereinafter.

In the above mentioned specific illustration, although there was mentioned a case wherein two kinds of polycapamide having different intrinsic viscosities are conjugate spun in a side by side type, the method of the invention can be applied to a combination of homologous polymers, for example, a combination of the same kind of polyesters having different intrinsic viscosities, a combination of the same kind of polyolefins having different melt indexes; a combination of different kinds of homopolyamides, such as, polycapramide/polyhexamethylene adipamide, polycapramide/polyhexamethylene sebacamide, polyhexamethylene adipamide / polyaminoundecanoic acid; a combination of homopolyester and homopolymester ether, such as polyethylene terephthalate/polyethyleneparaoxybenzoate; a combination of homopolyolefins, such as polyethylene having a high density/polyethylene having a low density, polyethylene having a high density/isocactic polypropylene; a combination of homologous homopolymer and copolymer, such as polycapramide/polycapramide-polyhexamethylene isophthalamide copolymer, polyhexamethyleneadipamide/polyhexamethylene adipamide-polyhexamethylene terephthalamide copolymer, polyethylene terephthalate/polyethylene terephthalate-polyethyleneisophthalate copolymer; a combination of different kinds of polymers, such as, polyamide/polyester, polyester/polyolefin,polyamide/polyolefin,polysulfonamide/polyurea, polyamide/polyolefin, polyvinyl chloride/polyvinylidene chloride. Furthermore, thermoplastic synthetic linear polymers, such as polyurethane, polyoxymethylene, polypivalolactone and polychlorotrifluoroethylene can be used properly by combining with the above mentioned various kinds of polymers. Further, besides the copolymers, graft polymers and mixtures thereof or the above described polymers added with viscosity stabilizer, dyestuff, pigment, plasticizer and other organic or inorganic additives can, of course, be used.

Although according to a suitable combination of these polymers, the optimum spinning temperatures of the two spinning materials may be substantially the same and said two spinning materials may show substantially the same melt viscosity in such a temperature, the method of the invention can be advantageously applied in order to improve the spinning condition, spinnability and properties of filament except such a case. Namely, even if the ratio of melt viscosity of the two polymers to be used at the same temperature is within the range of from 0.4 to 2.5, it is very effective to approach the ratio to 1.0 according to the present method. By such a means the bending phenomenon of the spun melt in the conjugate spinning is suppressed to minimum or solved entirely and the two kinds of polymers can be smoothly spun with an extremely excellent arrangement without attending fluctuation phenomenon and unevenness of tension, so that a composite filament of excellent properties having extremely even size of filament and a constant conjugate ratio along the length of filament and having no unevenness in strength, elongation and Young's Modulus can be produced.

Furthermore, the conjugate state of the two kinds of fiber forming polymers according to the present method may be an arrangement in which said polymers are bonded in a side by side relation along the filament axis or an arrangement in which said polymers are bonded in a eccentric core and sheath relation. In these cases, the conjugate ratio can be varied properly.

Moreover, the composite filament obtained by the present method may be non-circular as well as circular in the cross section.

The improved spinneret to be used for practice of the present method comprises two filter blocks provided with solution reservoirs connecting to separate tubes for transferring the spinning solutions, a nozzle plate provided with at least one orifice, a breaker plate provided between said filter block and said nozzle plate and provided with two channels to introduce two spinning solutions fed from said solution reservoirs to the rear of the same orifice separately, means for controlling the temperatures of two kinds of spinning solutions separately and heat insulators for preventing transmission of heat between the spinning solutions.

For a better understanding of the invention, reference is taken to the accompanying drawings, wherein FIG. 1 is a diagram showing a relation of intrinsic viscosity to melt viscosity at the melting temperature;

Figure 1:
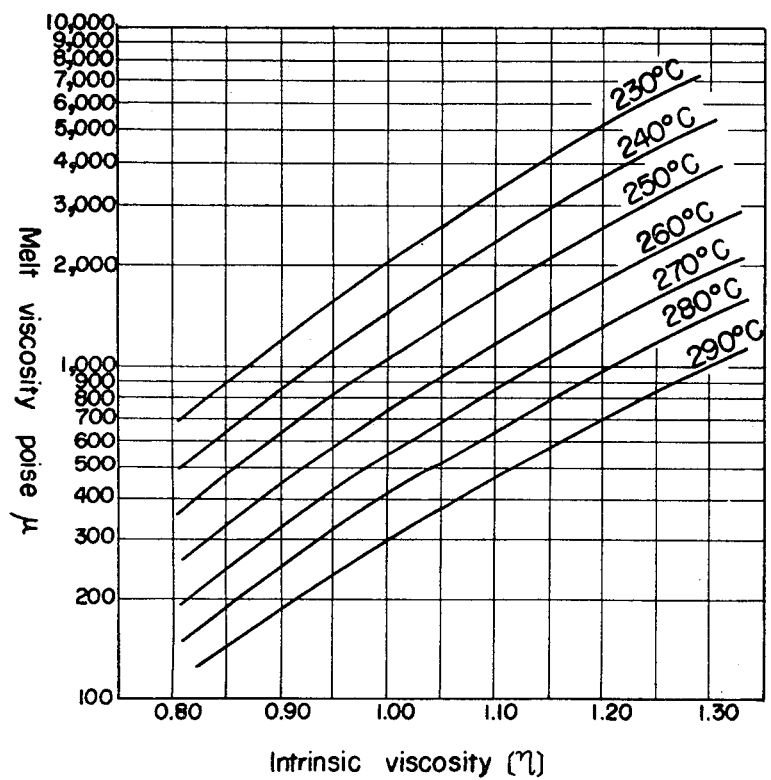

Referring to the drawings, the spinneret according to the invention comprises four main parts, that is, feeding block I, filter block II, breaker plate III and nozzle plate IV. The feeding block I is provided with tubes 3 and 3' for transferring the spinning solutions which are connected to melting apparatus through measuring pump (not shown). Two kinds of spinning solutions in heated and molten state are fed continuously to the solution reservoirs 2 and 2' in the filter block II through the tubes 3 and 3' respectively. The spinning solutions, after filtered through filter 4 and 4' consisting of usually, gauze and finely divided quartz and provided in the solution reservoirs 2 and 2' are introduced into spaces between channels 5 and 5' provided beneath the breaker plate III and upper face of the nozzle plate IV and are combined at the rear 6 of the orifice 7 provided in the nozzle plate IV and bonded in an adjacent type and then extruded from the orifice 7.

The tubes 3 and 3' for transferring the spinning solutions and the solution reservoirs 2 and 2' are insulated thermally by heat insulators 8 and 9 respectively. It is preferable to insert a heat insulator 10 in the center portion of the breaker III. The heat insulator is moulded into block having suitable thickness with a known heat insulator, such as glass fiber of high silicate glass, asbestos and diatomaceous earth and glass fiber and asbestos are particularly preferable. It is preferable to provide one or more rows of ventilating holes 13 in the heat insulators, through which a gas having proper temperature and pressure is passed during a long period of spinning operation to improve the effects for maintaining the temperature and insulating heat.

The feeding block I, the filter block II, the breaker plate III and the nozzle plate IV are connected through packings respectively and the assembly is heated by a proper means from the periphery thereof, whereby the temperatures of the spinning solutions in the passages for the spinning solutions including the solution reservoirs are heated or maintained at the proper given temperatures. The heating is effected by heating apparatuses to heat two clocks separated by the aforesaid heat insulators 8 and 9 independently so as to keep the two spinning solutions at different temperatures respectively. In the drawings, 11 and 11' are independent electric heaters respectively and said heaters are provided with terminals 12 and 12' at the lower part, whereby electric currents are fed from the outer part. It is preferable that a part of lower portion of each electric heaters is inserted into intermediate portion of the nozzle plate 4 in order to control the temperature at the surface of the nozzle plate easily and to prevent the thermal loss.

It is very easy and advantageous that the heating is effected by jackets for circulating a heat medium, such as DOWTHERM in addition to the above described electric heater. The control of temperature in the heating means can be effected by a proper conventional automatic temperature regulator.

The nozzle plate IV is provided with one or more of orifices 7. The position of the orifices is usually selected in such a manner that the lengths of courses of the channels 5 and 5' of the breaker plate III are same, but it is possible to produce multifilament in which the optimum conjugate ratios of the two kinds of polymers between every spun filament are varied respectively by deviating more or less each position of the orifices.

The assembly of the spinneret is further intercepted from the outer temperature by means of column for maintaining temperature (not shown).

Figure 8:
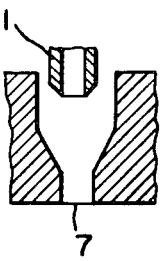
FIG. 8 is an enlarged vertically sectional view illustrating the part of spinneret shown in FIG. 5.

In the spinneret of the other embodiment of the invention shown in FIGS. 5 to 8, the spinning solution fed through the filter 4 from the solution reservoir 2 is extruded from the orifice 7 through the channel 5 provided in the lower part of the breaker plate III. On the other hand, the other spinning solution fed through the filter 4 from the solution reservoir 2' to the breaker plate III is introduced into the inner orifice 1 through the channel 5' provided on the upper surface of the breaker plate. As shown in FIG. 8 the central axis of the inner orifice 1 is in an eccentric relation to the central axis of the orifice 7, so that the spinning solution extruded from the inner orifice 1 is surrounded eccentrically by the other spinning solution to form a core and sheath type of composite filament. In this embodiment, the means for heating is effected by heating media 14 and 14' circulating in independent jackets 11 and 11'. The medium for heating, for example, liquid or gaseous Dowtherm is previously adjusted to a given temperature and then introduced into the jacket and circulated in it. The above described spinneret is particularly, suitable for spinning composite filament having an eccentric core and sheath relation, so that it is effectively used when the spinning materials consisting of a combination of completely different polymers having no mutual adhesive property are selected.

Since the spinneret according to the present invention comprises means for controlling separately the temperatures of two spinning solutions and the heat insulators for preventing each spinning solution from transmission of heat, a specific function which has never been attained by a known spinneret, that is, a specific effect and function, by which the melt temperatures of two spinning solutions in the spinneret for conjugate spinning are adjusted and controlled independently and optionally respectively, can be obtained. Moreover, the spinneret is used most advantageously in the practice of the method of the invention and it is possible to provide a large number or orifices with a smaller distance than that of the conventional one due to the fact that the bending phenomenon of the filament in the spinning is solved, so that the spinning velocity can be increased and also the extruded amount per unit area of the spinneret can be increased to at least 1.5 times the conventional process, whereby the production efficiency is increased and the production cost is decreased.

Thus, according to the method of the invention and the apparatus thereof, the composite filament having an excellent spinnability and improved properties can be easily produced and this filament can be utilized in a broad and commercial field, such as various commercial articles, for example, various clothes, unwoven fabrics, felts, filter cloths, packings, base cloths for artificial leathers or interior decorations, for example, carpets, curtains, bed clothes. Moreover, the composite filament obtained by the invention can be used as continuous filaments or cut fiber and also can be used in mix-spinning or mix-weaving with the other synthetic or natural fibers. This composite filament provides crimped filament having highly homogeneous crimp by subjecting this filament to conventional crimping treatments, such as heat treatment and swelling treatment. The treatment for developing crimp can be carried out in any step before or after production of the above described articles.

Although in the above described illustration, the production of the composite filament consisting of two kinds of spinning materials was described, when conjugate spinning three or more spinning materials the method and the apparatus according to the invention can be easily modified within the scope of the invention.

The melt viscosity of the thermoplastic synthetic linear polymer can be determined by various measuring methods, such as falling sphere viscosimeter, capillary viscosimeter and rotational viscosimeter. However, in many cases, the value varies depending upon the measuring method, so that it is necessary to determine the melt viscosity by the same measuring method. All the melt viscosities described in the following examples were determined by the capillary viscosimeter method. Furthermore, the determination of unevenness of size of filament was made by Uster C type made by Zellweger Co., Switzerland.

A crimpability in hot water and load value for 50 percent shrinkage of the composite filament are determined as follows:

Each length of 30 samples having about 25 cm of length is determined and the length is expressed by $l_0$. Such samples are immersed in boiling water at 100° C under no load for 10 minutes to develop crimp and then dried in air and the length of the dried samples is expressed by $l_1$. Thereafter the samples are suspended perpendicularly by 0.3 g/d of load at one end to remove the crimp and the length of the samples is expressed by $l_2$. Then the crimpability in hot water can be shown by the following equation:

Crimpability (percent) $l_2 - l_1/0 \times 100$

This crimpability was determined by average value of the found values of 30 samples. Furthermore, the lengths, when applied various loads to this crimped filament are plotted to the load and the load value (mmg/denier) corresponding to length of 50 percent shrinkage was determined from the graph. This value was referred to as "the load value for 50 percent of shrinkage."

The invention will be illustrated more in detail with reference to the following examples:

EXAMPLE 1

Figure 2:
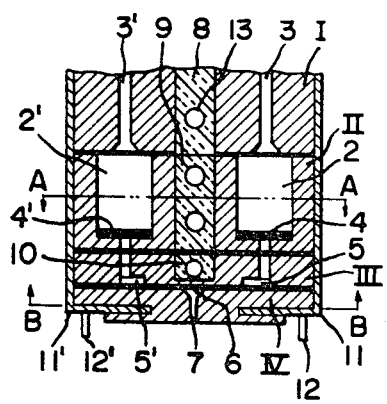
FIG. 2 is a vertically sectional view illustrating an embodiment of the apparatus according to the present invention.
Figure 3:
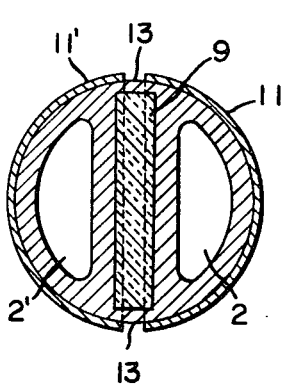
FIGS. 3 and 4 are cross-sectional views taken along lines A—A and B—B of FIG. 2, respectively.
Figure 4:
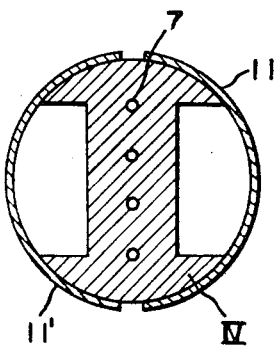

When the melt viscosity at 300° C of polyhexamethylene adipamide (Nylon 66) having melting point of 265° C was determined, it was 430 poises. On the other hand, the melt viscosity at 250° C of polycapramide (Nylon 6) having melting point of 215° C was 840 poises. The chips of the both polymers were fed into screw type of separate melt-extruders, melted and then introduced into the spinneret shown in FIG. 2 through the transferring tube to conjugate spin the polymers side by side.

The operation condition and the properties of the filament were as follows:

TABLE 1.

| Heating Condition (°C.) | | | |
|---|---|---|---|
| Determined Portion | | Nylon 6 | Nylon 66 |
| Extruder cylinder | Preheating portion | 210 | 220 |
| | Melting portion | 260 | 285 ± 5 |
| | Measuring portion | 255 | 286 ± 6 |
| Adaptor | | 257 | 285 ± 5 |
| Transferring tube | | 255 | 287 |
| Spinneret head | | 260 | 287 |
| Nozzle plate surface | | 260 | 280 |

TABLE 2.

| Spinning and Drawing Condition | |
|---|---|
| Number of revolution of extruder screw (r.p.m.) | 20 |
| Amount of delivery from measuring pump (g/min.) | 17.5 each |
| Orifice diameter (mm φ) | 0.3 |
| Number | 7 |
| Take-up velocity (m/min.) | 700 |

| Drawing velocity (m/min.) | 500 |
|---|---|
| Drawing ratio (x) | 3.5 |

TABLE 3.

| Properties of Filament | |
|---|---|
| Size (d/filament) | 128/7 |
| Unevenness of side of filament (%) | 1.7 |
| Strength (g/d) | 5.32 |
| Elongation (%) | 29.6 |
| Crimpability (%) | 62.3 |
| Load value for 50% shrinkage (mg/d) | 0.29 |

The filament spun in the above described operation conditions had no bending phenomenon immediately after spinning, so that it did not adhere to the spinneret surface and was produced very efficiently and moreover, the filament was not broken in the drawing and the degree of unevenness was highly excellent.

The melt viscosity at 280° C of Nylon 66 chip used in the spinning was 620 poises and the melt viscosity at 260° C of Nylon 6 chip 580 poises and it was ascertained that each melt viscosity in spinning of the both polymers was very near.

When the both polymers were spun at 280° C of the temperature in spinneret surface by means of a known conjugate spinning spinneret, the filament deviated by 45° from the line perpendicular to the spinneret surface immediately after spinning and the unevenness of size of the resulting filament was 4.9 percent.

EXAMPLE 2

Polycapramide (Nylon 66) having melt viscosity at 250° C of 440 poises and polyhexamethylene sebacamide (Nylon 6.10, melting point 225° C) having melt viscosity at 260° C of 1,480 poises were conjugate spun side by side in a conjugate ratio of 1:1 by using a conventional spinneret. In this case, the temperature of spinneret surface was set at 250° C, however, the difference of melt viscosities of the above polymers was large, so that the filament bent considerably to Nylon 6.10 side immediately after spinning and finally adhered to spinneret surface, so that the filament could not be formed.

Then, the same conjugate spinning was effected by using the same spinneret as described in Example 1. The operation conditions were shown in Tables 4 and 5 and the properties of the resulting filament were shown in Table 6.

TABLE 4.

| Heating Condition (°C.) | | | |
|---|---|---|---|
| Determined portion | | Nylon 6 | Nylon 6.10 |
| Extruder Cylinder | Preheating portion | 210 | 210 |
| | Melting portion | 255 | 275 |
| | Measuring portion | 255 | 275 |
| Adaptor | | 254 | 280 |
| Transferring tube | | 252 | 280 |
| Spinneret head | | 252 | 290 |
| Nozzle plate surface | | 250 | 288 |

TABLE 5.

| Spinning and Drawing condition | |
|---|---|
| An amount of delivery from measuring pump (g/min.) | 12 each |
| Orifice diameter (mmφ) | 0.3 |
| Number | 18 |
| Take-up velocity (m/min.) | 995 |

| Drawing velocity (m/min.) | 500 |
|---|---|
| Drawing ratio (x) | 3.41 |

TABLE 6.

| Properties of Filament | |
|---|---|
| Size (d/filament) | 69.5 |
| Unevenness of size of filament (%) | 2.0 |
| Strength (g/d) | 4.84 |
| Elongation (%) | 31.6 |
| Crimpability (%) | 69.5 |
| Load value for 50% shrinkage (mg/d) | 0.365 |

By spinning under such a condition the bending phenomenon of the filament was considerably improved as compared with the case using the above described conventional spinneret and even if the take-up velocity was increased to 995 m/min. even composite filament could be obtained without causing any defects. Both the crimpability of the developed crimp and crimp elasticity expressed by load value for 50 percent shrinkage showed excellent values. It has been ascertained that the melt viscosity at extrusion temperature of Nylon 6.10 was 550 poises.

EXAMPLE 3

Figure 5:
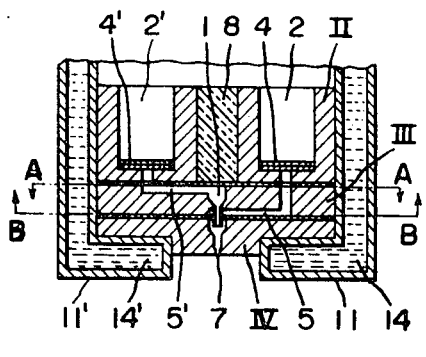
FIG. 5 is a vertically sectional view illustrating an alternate embodiment of the invention.
Figure 6:
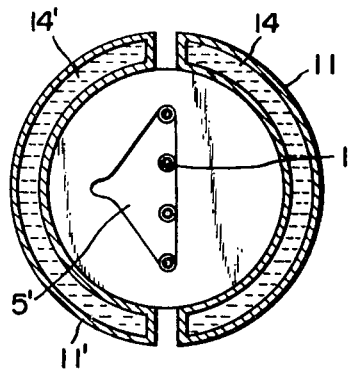
FIGS. 6 and 7 are cross-sectional views taken along lines A—A and B—B of FIG. 5, respectively.
Figure 7:
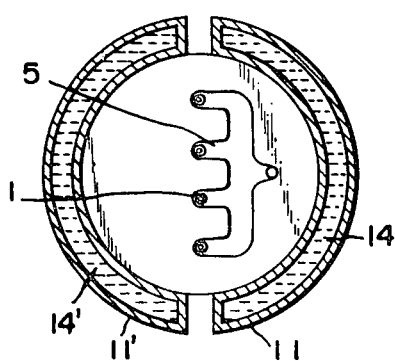

Polycapramide having melt viscosity at 250° C of 2,900 poises and polyethylene having high density (melting point 130° C) having melt viscosity at 165° C of 2,100 poises were melted separately by two melting extruders and the molten polymers was conjugate spun by using the spinneret shown in FIG. 5 in such a manner that polycapramide was surrounded by polyethylene in an eccentric core and sheath relation.

Said polymers were spun by means of a well known type of spinneret and by setting the temperature of spinneret surface at 240° C, but the spun filament was considerably bent and the spinning could not be effected.

The operation conditions in spinning by means of the spinneret shown in FIG. 5 and the results are shown in Tables 7 to 9.

TABLE 7.

| Heating Condition (°C.) | | | |
|---|---|---|---|
| Determined portion | | Nylon 6 | Polyethylene |
| Extruder cylinder | Preheating portion | 209 | 120 |
| | Melting portion | 290 | 180 |
| | Measuring portion | 290 | 180 |
| Adaptor | | 288 | 179 |
| Transferring tube | | 286 | 178 |
| Spinneret head | | 295 | 180 |
| Nozzle plate surface | | 292 | 180 |

TABLE 8.

| Spinning and Drawing Condition | |
|---|---|
| An amount of delivery from measuring pump (g/min.) | 49 each |
| Orifice diameter (mm φ) | 0.5 |
| number | 18 |
| Take-up velocity (m/min.) | 700 |
| Dry heat drawing | |
| Drawing velocity (m/min.) | 300 |
| Drawing ratio (x) | 5.0 |
| Drawing temperature (°C) | 60 |

TABLE 9.

Properties of Filament

| | |
|---|---|
| Size (d/filament) | 248.4/18 |
| Unevenness of size of filament (%) | 2.4 |
| Strength (g/d) | 5.7 |
| Elongation (%) | 28 |
| Crimpability (%) | 57 |
| Load value for 50% shrinkage (mg/d) | 0.25 |

When the spinning was started, some bending phenomena of the filament were observed, but the spinning and drawing operations were carried out smoothly and the resulting filament had excellent evenness. The melt viscosities at the extrusion temperature of Nylon 66 and polyethylene were 720 poises and 1,280 poises respectively.

EXAMPLE 4

The melt viscosities at various temperatures of polycapramide having intrinsic viscosity of 0.96 were determined and the results are shown in Table 10.

TABLE 10

| Temperature °C. | Melt viscosity (poises) |
|---|---|
| 250 | 840 |
| 255 | 690 |
| 265 | 480 |
| 275 | 350 |
| 280 | 320 |
| 285 | 270 |

Polyethylene terephthalate having melt viscosity of 820 poises at 285° C and said polycapramide were conjugate spun by using the spinneret as used in Example 3 through orifice of 0.3 mm $\phi \times$ 18 holes in a conjugate ratio of 1:1 in such a manner that said polycapramide was surrounded eccentrically by said polyethylene terephthalate. The temperature of spinning polycapramide was varied by adjusting the temperature in two Dowtherm jacks surrounding the spinneret and the spinnability was observed. The temperature of spinning polyethylene terephthalate was kept at 285° C. The taken-up composite filament was further drawn by 3.8 times in drawing velocity of 500 m/min. at 80° C and the drawn filament was determined with respect to unevenness of size of filament. The obtained result is shown in Table 11.

TABLE 11

| Spinning temp. of polycapr-amide (°C.) | Spinnability | Unevenness of size of filament (%) |
|---|---|---|
| 285 | Filament adhered to the spinneret surface and the spinning could not be effected. | — |
| 280 | Filament considerably bent to polyethylene terephthalate side and some breaks occurred | 5.3% |
| 275 | Filament deviated by about 35° from the line perpendicular to the front edge of the spinneret, but break did not occur, spinnability was good and the take-up velocity was 700 m/min. | 2.8% |
| 265 | The deviation decreased to about 25°, break did not occur, spinnability is good and take-up velocity was 900 m/min. | 2.4% |
| 255 | Bending phenomenon was not substantially observed, take-up velocity was 1,100 m/min. and spinnability was very excellent. | 1.8% |

EXAMPLE 5

Polycapramide having a high degree of polymerization and melt viscosity at 250° C of 3,200 poises and polycapramide/polyhexamethylene adipamide copolymer (copolymerization ratio 90/10 by weight, melting point: 190° C) having melt viscosity at 225° C of 640 poises were conjugate spun in a side by side type by using the same spinneret as used in Example 1 in a conjugate ratio of 1:1. In the spinneret used, 18 holes, each diameter of which is 0.3 mm $\phi$, were arranged in distance of 3 mm.

When the temperature of the spinneret surface in homopolyamide side was set at 270° C and that in copolyamide side was set at 225° C, the melt extruded from the orifice bent considerably to homopolyamide side, while filament was formed, but the resulting filament adhered sometimes with adjacent melt in filament state.

When the temperature of the spinneret surface in homopolyamide was set at 290° C and that in copolyamide was set at 225° C, the composite filament could be obtained efficiently without adhering or contacting with adjacent filamentary melts. The resulting undrawn filaments were drawn at a drawing velocity of 500 m/min., at room temperature by 3.8 times to obtain drawn yarn of 70 deniers/18 filaments. The property of said filament shown in Table 12.

TABLE 12.

Properties of Filament

| Temperature for spinning homo-polyamide | Unevenness of size of filament | Conjugate form* |
|---|---|---|
| 270 | 4.8 | Uniformity was observed in the conjugated line |
| 290 | 2.0 | The conjugated line is substantially straight and uniform |

*Cross section and vertical section of the filament were observed by polarization microscope.

EXAMPLE 6

Polyethylene terephthalate (polyester) having melt viscosity at 285° C of 2,200 poises and melt viscosity at 290° C of 1,800 poises and polyethylene-p-oxybenzoate (polyester ether, melting point : 220° C) having melt viscosity at 255° C of 1,700 poises (melt viscosity at 285° C of 900 poises were conjugate spun in a side by side type by means of the spinneret described in Example 1 in a conjugate ratio of 1:1. The temperature condition, the spinning and drawing condition and the properties of filament are shown in Tables 13 to 15 respectively.

TABLE 13.

Heating Condition (°C.)

| Determined portion | | Polyester | Polyester ether |
|---|---|---|---|
| Extruder cylinder | Preheating portion | 235 | 210 |
| | Melting potion | 280 | 260 |
| | Measuring portion | 280 | 255 |
| Transferring tube | | 280 | 255 |
| Spinneret | | 290 | 255 |

TABLE 14.

Spinning and Drawing Condition

| | |
|---|---|
| Extruded amount (g/min.) | 17.5 each |
| Spinneret used diameter (mm $\phi$) | 0.3 |
| number | 18 |
| Take-up velocity (m/min.) | 600 |
| Drawing ratio ($x$) | 4.07 |
| Drawing temperature (°C) | 100 |
| Drawing velocity | 87 |

TABLE 15.

Properties of Filament

| | |
|---|---|
| Size (d/filament) | 136.8/18 |
| Strength (g/d) | 4.30 |
| Elongation (%) | 49.83 |
| Young's Modulus (g/d) | 31.59 |
| Crimpability (%) | 73.7 |
| Load value for 50% shrinkage (mg/d) | 0.22 |
| Unevenness of size of filament | 1.8 |

The spinning was carried out very smoothly and the filament had satisfactory evenness. When said polymers were conjugate spun at 285° C by means of a well known spinneret, the bending phenomena immediately after spinning was very much and satisfactory spinning operation can not be carried out.

EXAMPLE 7

Polycapramide chip having intrinsic viscosity of 0.95 after washed with water and dried, had melt viscosity at 250° C of 850 poises. The same chip which was not washed with water (monomer content, 9.5 percent by weight) had melt viscosity at the same temperature of 320 poises. The both polymers were conjugate spun in side by side type by means of the spinneret as described in Example 1 at a conjugate ratio of 1:1. The spinneret was connected to two fire grid type melting apparatuses. The heating condition, the spinning condition and the property of filament are shown in Tables 16 to 18, respectively.

TABLE 16.

| | Heating Conditions (°C.) | |
|---|---|---|
| | Water-washed chip | Unwashed chip |
| Fire grid | 280 | 250 |
| Transferring tube | 275 | 250 |
| Spinneret | 280 | 250 |

TABLE 17.

Spinning and Drawing Condition

| | |
|---|---|
| Extruded amount (g/min.) | 17.5 each |
| Spinneret diameter (mm $\phi$) | 0.25 |
| number | 18 |
| Take-up velocity (m/min.) | 600 |
| Drawing ratio ($x$) | 3.5 |
| Drawing velocity (m/min.) | 500 |

TABLE 18.

Properties of Filament

| | |
|---|---|
| Size (d/filament) | 163/18 |
| Strength (g/d) | 5.83 |
| Elongation (%) | 38.25 |
| Crimpability (%) | 78.5 |
| Load value for 50% shrinkage (mg/d) | 0.35 |
| Unevenness of size of filament (%) | 1.83 |

Although said polymers were extruded through a well known spinneret for conjugate spinning at a temperature of 260° to 270° C, the extruded polymers adhered to the spinneret surface and the spinning could not be carried out.

What is claimed is:

1. A spinneret for producing a composite filament, which comprises a filter block provided with two solution reservoirs connecting to separate tubes for transferring the spinning solutions, a nozzle plate provided with at least one orifice, a breaker plate provided between said filter block and said nozzle plate and provided with two channels to introduce two spinning solutions from said solutions reservoirs to the rear of the same orifice separately, heating means for controlling temperature of two kinds of spinning solutions separately which surround the filter block, the breaker plate, and the nozzle plate, and heat insulating means for preventing transmission of heat between the spinning solutions.

2. A spinneret as claimed in claim 1, wherein the means for controlling temperature are jackets to heat each half spinneret divided into two parts by heat insulating means independently from the outside, in which heating media are circulated.

3. A spinneret as claimed in claim 2, wherein the means for controlling temperature are electric heaters to heat each half spinneret divided into two parts by heat insulation means independently from the outside.

4. A spinneret for producing a composite filament, which comprises a filter block provided with two melt reservoirs connecting to separate tubes for transferring the spinning melts, a nozzle plate provided with at least one orifice, a distributor plate provided between said filter block and said nozzle plate and provided with two channels to introduce two spinning melts from said melt reservoirs to the rear of the same orifice separately, means for controlling the temperatures of the two spinning melts separately which surround the filter block, the breaker plate, and the nozzle plate, and heat insulating means for retarding transmission of heat between the spinning melts.

5. A spinneret as claimed in claim 4, wherein the heat insulating means include heat insulators provided between the two melt reservoirs.

6. A spinneret as claimed in claim 4, wherein at least one row of ventilating holes are provided in the heat insulator.

7. A spinneret as claimed in claim 4, wherein the means for controlling temperature are electric heaters to heat each half spinneret.

* * * * *